(12) United States Patent
Rodman

(10) Patent No.: US 6,230,764 B1
(45) Date of Patent: May 15, 2001

(54) ICE CREAM CONE HOLDER AND DRIP COLLECTOR DEVICE

(76) Inventor: David L. Rodman, 556 Overlook Dr., Alliance, OH (US) 44601

( * ) Notice: Subject to any disclaimer, the term of this patent is extended or adjusted under 35 U.S.C. 154(b) by 0 days.

(21) Appl. No.: 09/541,634

(22) Filed: Apr. 3, 2000

Related U.S. Application Data

(62) Division of application No. 09/337,838, filed on Jun. 22, 1999.

(51) Int. Cl.[7] ............................... B65B 1/04; B65B 3/04; B67C 3/02
(52) U.S. Cl. ........................... 141/86; 426/132; 426/139; 229/932; 220/501; 220/502
(58) Field of Search ............................... 141/86; 426/132, 426/139; 229/932; 220/501, 506

(56) References Cited

U.S. PATENT DOCUMENTS

| | | | |
|---|---|---|---|
| 1,304,410 | 5/1919 | Thorton | 229/932 |
| 1,616,570 | * 2/1927 | Boynton | 229/932 |
| 1,800,759 | 4/1931 | Shean | 229/932 |
| 1,854,091 | 4/1932 | Young | 229/932 |
| 1,920,995 | 8/1933 | Legge | 229/1.5 |
| 2,948,452 | 8/1960 | Grogan et al. | 229/1.5 |
| 3,306,512 | 2/1967 | Pagnini | 229/1.5 |
| 4,226,355 | 10/1980 | Helfrich, Jr. | 229/1.5 H |
| 4,718,594 | 1/1988 | Harazi | 229/1.5 H |
| 4,720,037 | 1/1988 | Alpert | 229/1.5 H |
| 5,152,454 | 10/1992 | Warta et al. | 229/1.5 H |
| 5,224,646 | 7/1993 | Biancosino | 229/1.5 |

FOREIGN PATENT DOCUMENTS 136864  3/1999  (AU) .

* cited by examiner

Primary Examiner—Timothy L. Maust
(74) Attorney, Agent, or Firm—Renner, Kenner, Greive, Bobak, Taylor & Weber

(57) ABSTRACT

An ice cream cone holder and drip collector device (10, 100, 200) includes a sleeve (12, 14) having an open upper end (16). A drip catcher (18, 28) is attached to the sleeve (12, 14) and includes an inner wall (20) that extends downwardly from the periphery of the open upper end (16) of the sleeve (12, 14). An outer wall (22) can be separated from the inner wall (20) by a spacer wall (24), the inner wall (20), outer wall (22), and spacer wall (24) forming the drip catcher (18). Because the drip catcher (18) attaches to the sleeve (12) at the open upper end (16) of the sleeve (12) and the drip catcher (18) provides no surface that is parallel to the vertical plane, a plurality of devices (10) can be intimately stacked one on top of the other and packaged in high density. Alternatively, the same result can be accomplished by a foldable skirt (34) attached to a sleeve (32) which is moveable from a first position wherein the skirt (34) conforms to the shape of the sleeve (32) to a second position wherein the skirt (34) extends outwardly from the sleeve (32) to form the drip collector (38).

10 Claims, 3 Drawing Sheets

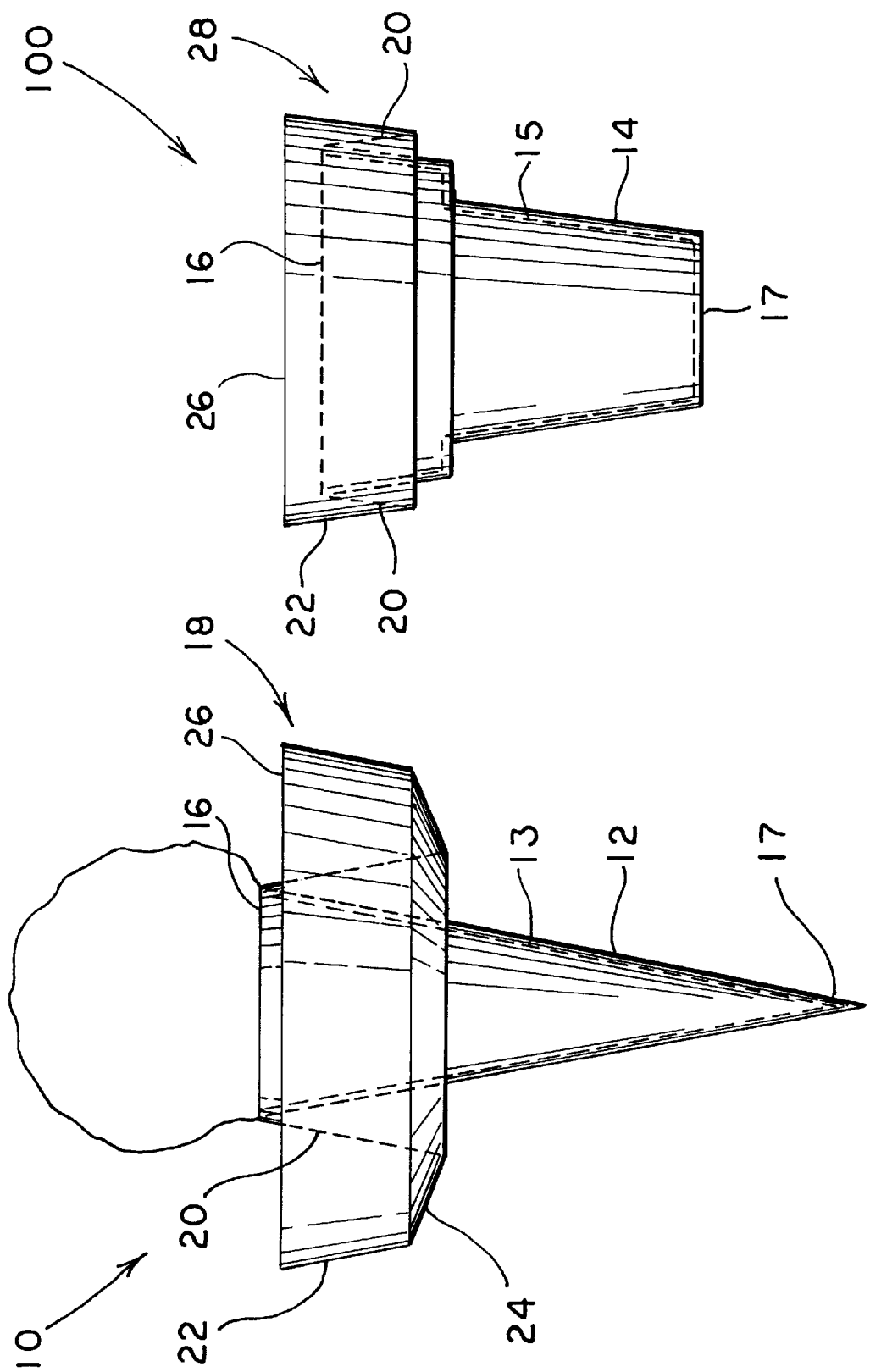

ICE CREAM CONE HOLDER AND DRIP COLLECTOR DEVICE

This application is a division of application Ser. No. 09/337,838, filed Jun. 22, 1999.

TECHNICAL FIELD

The present invention relates generally to an ice cream cone holder and more particularly to an ice cream cone holder having a drip collector device for sanitarily containing the dripping of an ice cream cone as it melts.

BACKGROUND ART

A common problem encountered when eating an ice cream cone is that, especially in extremely hot weather, the ice cream tends to melt faster than one can consume it. Consequently, ice cream tends to run down the side of the cone and onto the consumers' hand creating an unsanitary, sticky mess. Also, melted ice cream running down the side of the cone tends to absorb into the cone causing the cone to become soggy, harder to handle, and overall less enjoyable.

The most commonly attempted solution to this problem is to wrap a napkin around the cone. Although using a napkin in this manner may tend to mitigate some of the problems associated with a melting ice cream cone, the napkin absorbs melting ice cream such that the consumer still comes into contact with the ice cream absorbed into the napkin as does the ice cream cone, although perhaps to a lesser degree.

It is also common to purchase pre-made frozen ice cream cone products that are individually contained in a paper sleeve that encases both the cone and the ice cream thereon. The paper is torn away from the ice cream that tops the cone, while the paper sleeve is left surrounding the cone. These sleeves are no more effective than the napkin because the ice cream simply melts down the side of the paper sleeve creating the same problems.

In response to the problems associated with melting ice cream cones, and due to the fact that the commonly employed napkin and paper sleeve fail to substantially alleviate these problems, various cone holders and drip-collector devices have been developed. However, these prior art devices are somewhat cumbersome, not disposable, and generally impractical to use, and thus they have not met with wide-spread adoption and use.

Accordingly, the present invention is directed toward providing an improvement over the prior art in the area of ice cream cone holders and drip collectors. Specifically, there is a need in the art for an ice cream cone holder and drip collector device that can be conveniently packaged in high density or as part of a pre-made frozen ice cream cone product, that is inexpensive to manufacture, that is disposable, that can be quickly dispensed from its packaged arrangement and fitted to the ice cream cone, and that can substantially protect the cone itself from the deleterious effects that melting ice cream tends to have on the cone. The prior art devices, while individually addressing one or more of these concerns, have failed to provide a device that addresses all of them so as to provide a device that is practical for wide spread use. Thus, there exists a need in the art for an ice cream cone holder and drip catcher device that incorporates all of the above-referenced characteristics into its design, and such a device is disclosed herein.

DISCLOSURE OF THE INVENTION

It is therefore an object of the present invention to provide an ice cream cone holder and drip collector device that readily fits around an ice cream cone by substantially conforming to the shape of the cone.

It is another object of the present invention to provide an ice cream cone holder and drip collector device, as above, that will collect ice cream as it melts so as to protect the cone from becoming soggy as well as to protect the user and surrounding area from the dripping of melted ice cream.

It is yet another object of the present invention to provide an ice cream cone holder and drip collector device, as above, that can be packaged in high density such that a plurality of the devices may be intimately stacked on each other.

It is also an object of the present invention to provide an ice cream cone holder and drip collector, as above, that may alternatively be packaged as part of a pre-made frozen ice cream cone product.

It is still a further object of the present invention to provide an ice cream cone holder and drip collector device, as above, constructed of inexpensive and therefore readily disposable materials.

It is an additional object of the present invention to provide an ice cream cone holder and drip collector device, as above, that can be conveniently dispensed from its stacked arrangement and subsequently fitted onto the cone.

These and other objects of the present invention, as well as the advantages thereof over existing prior art forms, which will become apparent from the description to follow, are accomplished by the improvements hereinafter described and claimed.

In general, an ice cream cone holder and drip collector made in accordance with one embodiment of the present invention includes a sleeve having a lower end and an open upper end and shaped for receiving a least a portion of the cone. A drip catcher is attached to the sleeve and includes a wall connected to the sleeve. The drip catcher has no surfaces parallel to the vertical plane such that a plurality of the ice cream cone holder and drip collector devices may be intimately stacked and nested within each other.

Objects of the present invention may also be accomplished by another embodiment that includes a sleeve having an open upper end and a lower end and shaped for receiving at least a portion of the cone. A skirt is attached to the sleeve and can be manipulated from a first position wherein the skirt conforms to the shape of the sleeve to a second position wherein the skirt extends outwardly from the sleeve to provide a drip catcher to collect melting ice cream.

Preferred exemplary ice cream cone holder and drip collector devices incorporating the concepts of the present invention are shown by way of example in the accompanying drawings without attempting to show all the various forms and modifications in which the invention might be embodied, the invention being measured by the appended claims and not by the details of the specification.

BRIEF DESCRIPTION OF THE DRAWINGS

FIG. 1 is a side view of an ice cream cone holder and drip collector device made in accordance with one embodiment of the present invention.

FIG. 2 is a side view of an ice cream cone holder and drip collector device having a drip catcher that is slightly modified in configuration from the drip catcher of FIG. 1.

PREFERRED EMBODIMENTS FOR CARRYING OUT THE INVENTION

Figure 3:
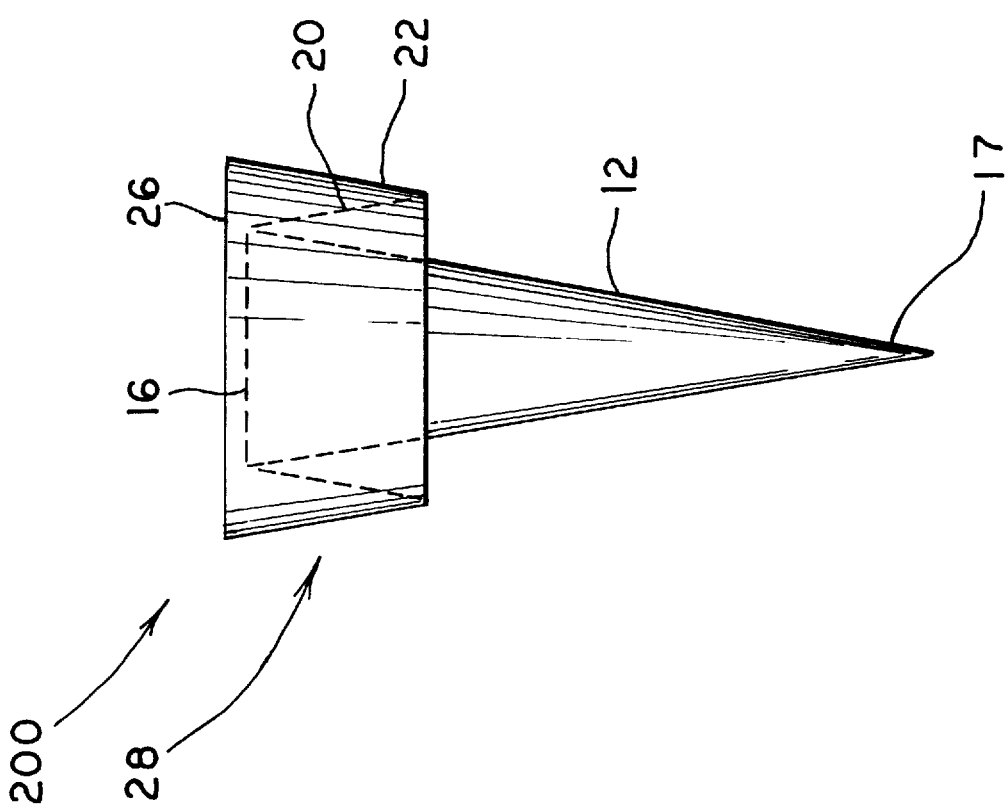
FIG. 3 is a side view of an ice cream cone holder and drip collector device having a sleeve that is slightly modified from that of FIG. 2 so as to accommodate a different-shaped ice cream cone.

One embodiment of the present invention, and slight modifications thereof, is shown in FIGS. 1–3. Referring now to FIG. 1, an ice cream cone holder and drip collector device is designated generally by the numeral 10. Referring to FIGS. 2 and 3, it can be seen that exemplary modifications of device 10 are designated by the numerals 100 and 200, respectively. Devices 10, 100 and 200 may be constructed of thin paper, plastic, or other suitable materials preferably resistant to the moisture of melted ice cream and inexpensive so as to be readily disposable. It is most preferred that devices 10, 100 and 200 be of unitary construction made from an extruded plastic material such as a polyolefin. However, various materials, whether more or less desirable due to their individual characteristics, are contemplated by the present invention and fall within its scope.

Ice cream cone holder and drip collector device 10 includes a sleeve 12 which is shaped according to the shape of the cone to which device 10 is to be fitted. In FIG. 1, sleeve 12 is shown as having a frusto-conical shape so as to accommodate the common sugar cone 13. However, as can be seen in modified device 100 of FIG. 2, sleeve 12 need not be frusto-conical. In FIG. 2, sleeve 14 replaces sleeve 12 and is shaped to accommodate the common cake cone 15. The shapes exemplified by sleeves 12 and 14 accommodate the most commonly found ice cream cone shapes, however, the present invention is not limited thereto or thereby and sleeves 12, 14 may be configured to various shapes in order to accommodate the various cone shapes currently available or those shapes which may become available in the future.

Sleeves 12, 14 provide an open upper end 16 whereby sleeves 12, 14 receive the similarly shaped ice cream cones 13, 15, respectively. Preferably, sleeves 12, 14 are sized so that, when an ice cream cone is placed in either sleeve 12, 14, open upper end 16 lies adjacent to the open upper end of the cone. However, it is contemplated that, in the interest of minimizing the amount of materials needed to practice the present invention, sleeves 12, 14 may be sized so that open upper end 16 lies somewhere below the open upper end of the ice cream cone to which device 10, 100 is fitted. The preferred design for the present invention places open upper end 16 adjacent to the open upper end of the ice cream cone so that there is less tendency for melting ice cream to come into contact with the cone and cause it to become soggy or otherwise sticky and messy to handle. Furthermore, in furtherance of the interest in reducing material costs, sleeves 12, 14 need not extend downwardly to cover the entire ice cream cone, but can rather be constructed so that the bottom of the ice cream cone protrudes from the bottom of sleeves 12, 14. In other words, it should be understood that a substantial amount of the lower portion of sleeves 12, 14 need not be provided. Nevertheless, as shown, it is preferred that sleeves 12, 14 have a lower end 17 which completely encloses the ice cream cone to which it is fitted so that, in the event that some melting ice cream flows down between the cone and sleeves 12, 14, such melted ice cream will stay inside sleeves 12, 14 so that it cannot come into contact with ones hands and the surrounding area. Thus, from the design aspects discussed above, it should be apparent that the present invention may be slightly modified so as to accommodate different ice cream cone shapes, and can be further modified so as to reduce material costs.

As mentioned above, devices 10, 100 and 200 are preferably constructed of paper, plastic or other suitable materials. It should now be noted that resilient materials are especially preferred inasmuch as they allow for slight deformation of sleeve 12, 14 thereby providing grip to the cone. Also, when device 10, 100 or 200 is constructed to completely enclose the ice cream cone, a resilient sleeve 12, 14 will facilitate removal of the cone. As such, as the user consumes the cone, a slight squeezing on sleeves 12 or 14 will push the cone upwardly through upper open end 16 to expose more of the cone for consumption. For these reasons, as well as cost and disposability considerations, devices 10, 100 and 200 are preferably constructed from inexpensive polyolefin materials.

Attached to sleeve 12 at open upper end 16 is a drip catcher generally indicated by the numeral 18. Drip catcher 18 includes an inner wall 20 which extends downwardly at an angle from the periphery of open upper end 16 and directs the flow of melted ice cream into drip catcher 18. An outer wall 22 is separated from inner wall 20 by a spacer wall 24. Spacer wall 24 provides drip catcher 18 with a larger volume and may therefore, in some instances, be desirable. However, in the interest of material costs, spacer wall 24 may be omitted. Upwardly extending outer wall 22 terminates at upper rim 26 which, as shown in FIG. 1, is positioned below open upper end 16. Such a positioning may be desirable to avoid interfering with the consumption of the ice cream cone.

Referring now specifically to the modified devices 100 and 200 shown in FIGS. 2 and 3, respectively, it can be seen that drip catcher 28, a modification of drip catcher 18, omits spacer wall 24 such that outer wall 22 extends directly from its connection with inner wall 20. Drip catcher 28 also differs from drip catcher 18 in that upper rim 26 of drip catcher 28 is shown as being positioned above open upper end 16 of the respective sleeve 12 or 14 from which drip catcher 28 extends. The configuration of drip catcher 28 may be preferred over the configuration of drip catcher 18 in that drip catcher 28 requires less material to construct and, in use, lies closer to the melting ice cream such that drips from the ice cream are less likely to miss drip catcher 28.

It should be understood that the modifications shown in FIGS. 2 and 3 are for exemplary purposes only and various shapes for both the sleeve and drip catcher are contemplated and fall within the scope of the present invention. Furthermore, it should be readily understood that the teachings hereinabove may be combined so as to provide various modified ice cream cone holder and drip collector devices and that all such devices fall within the scope of the present invention. For example, sleeve 12 or sleeve 14 may be used in conjunction with drip catcher 18 or drip catcher 28 and these sleeves and drip catchers may be further modified in shape or size, such configurations and modification nevertheless falling within the scope of the present invention.

Figure 4:
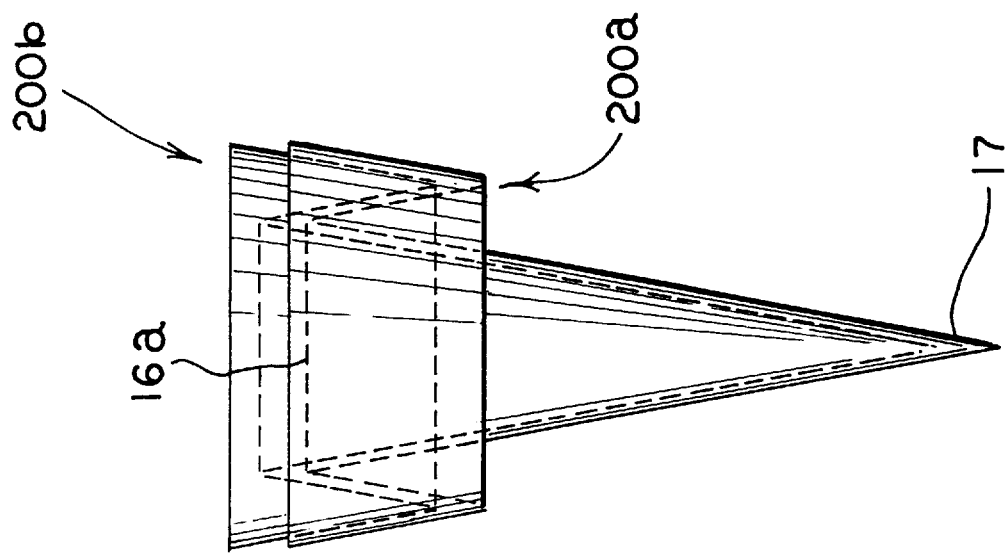
FIG. 4 is a side view of a plurality of devices as shown in FIG. 3 and displays the ability of a plurality of such devices

The manner in which the design of drip catcher 28, as well as its manner of attachment to sleeve 12, allows a plurality of devices 10, 100 or 200 to be intimately stacked on and nested within each other, such that the devices 10, 100 or 200 may be packaged in high density, is shown with respect to device 200 in FIG. 4. Because drip catcher 28 attaches to sleeve 12 at open upper end 16 by means of inner wall 20, and further in light of the fact that drip catcher 28 provides no surface that is parallel to the vertical plane, a first device 200a may receive a second device 200b through its open upper end 16a, the external surface area of device 200b thereby intimately contacting the interior surface of device 200a such that these two devices, 200a and 200b, when intimately stacked or nested within each other, occupy nearly the same amount of space as either device 200a or 200b would occupy alone. Thus, a multitude of devices 200 could be packaged together and yet occupy only a minimal amount of space. It should be readily apparent that this nesting ability is not limited to device 200 inasmuch as device 100 and device 10 have drip catchers 28 and 18, respectively, extending from sleeves 14 and 12, respectively, in an identical manner and, in addition, also lack surfaces parallel to the vertical plane.

The manner in which devices 10, 100 and 200 are packaged also makes it convenient to dispense such devices from a packaged arrangement for subsequent fitting onto a cone. A large number of stacked devices 10, 100 or 200 may be inserted into a dispensing tube having an open lower end and a diameter sized to hold drip catcher 18 or 28 with a slight frictional force. The lower most device 10, 100 or 200 in the stack would extend through the open lower end of the dispensing tube where its sleeve 12 or 14 could be grasped and pulled downward to release the device 10, 100, 200 from the dispensing tube and the bottom of the stack. This manner of dispensing devices 10, 100 and 200 is believed to be especially convenient in light of the fact that this dispensing method is substantially similar to the method currently used to dispense individual ice cream cones which are commonly stacked and held in dispensing tubes in a similar manner to that described above.

It is also contemplated that devices 10, 100 and 200 could be packaged as part of a frozen ice cream cone product. Currently, there exists various pre-made and ready-to-eat ice cream cone products that are individually packaged and sold having a sleeve surrounding the cone. It is believed that the present invention, by providing a drip catcher 18, 28, could improve the desirability of such ice cream cone products.

Figure 6:
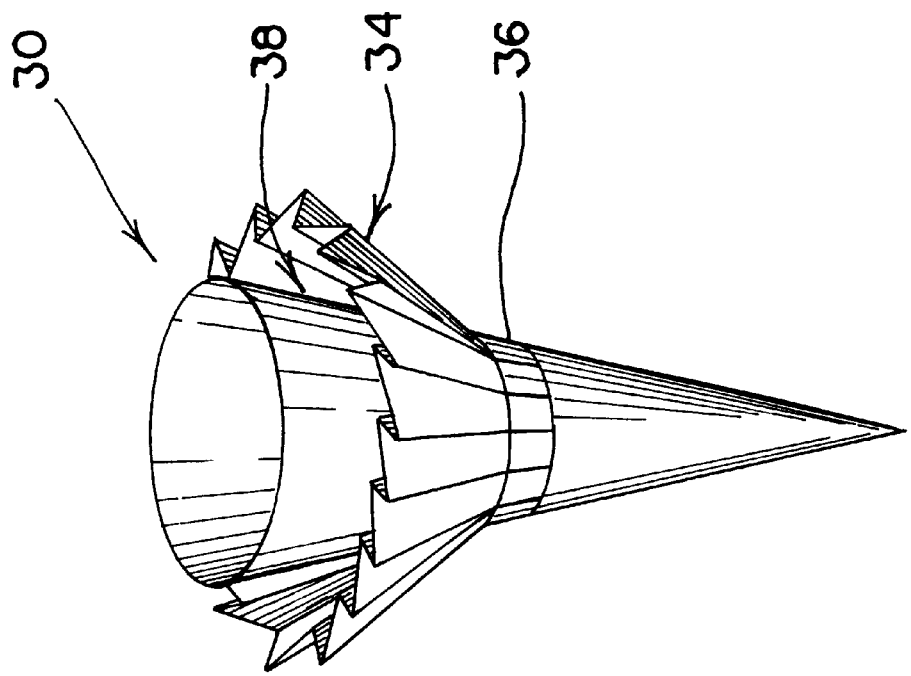
FIG. 6 is a side view of an ice cream cone holder and drip collector device made in accordance with the embodiment of FIG. 5 and showing such device in a second configuration.
Figure 5:
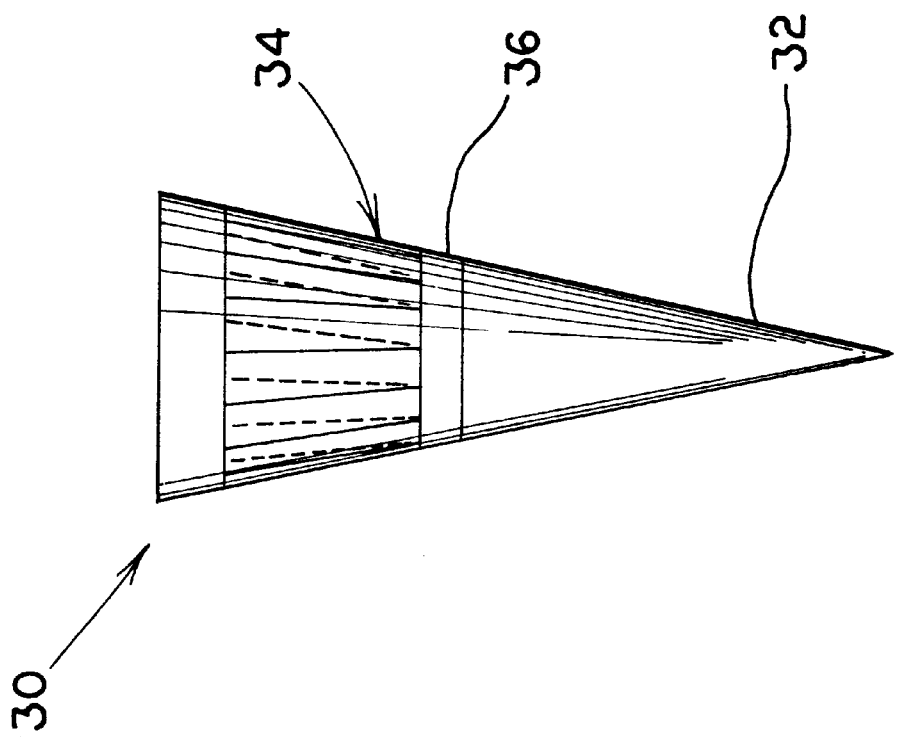
FIG. 5 is a side view of an ice cream cone holder and drip collector device made in accordance with another embodiment of the present invention and showing such device in a first configuration.

Another embodiment of the present invention is shown in FIGS. 5 and 6. This embodiment of the ice cream cone holder and drip collector of the present invention is designated generally by the numeral 30. Device 30 includes a sleeve 32 which, like sleeves 12 and 14, can take various modified shapes according to the configuration of the cone to be fitted, and is preferably constructed from the same thin, resilient materials. In device 30, however, the inner and outer walls take the form of a skirt 34 which is attached to sleeve 32 by a collar 36. Collar 36, by way of example, and without limitation, may be integral with skirt 34 and adhered to sleeve 32. Alternatively, collar 36 may be separate from sleeve 32, taking the form, for example, of a strip of suitable adhesive tape overlapping a portion of skirt 34 and sleeve 32. As can be clearly seen in FIGS. 5 and 6, skirt 34 folds in upon itself in an umbrella-like fashion such that skirt 34 can occupy a first position wherein it lies substantially flush with sleeve 32 as shown in FIG. 5, and a second position wherein it is fanned out from its attachment to sleeve 32 at collar 36 in order to provide a drip catcher area 38 as shown in FIG. 6. In the first configuration, a plurality of devices 30 can be intimately stacked one on top of the other so that the devices can be packaged in high density. Furthermore, from such a configuration, device 30 can be quickly and conveniently dispensed from this stacked configuration in a manner similar to that used to dispense individual ice cream cones. Indeed, it is contemplated that a large number of stacked devices 30 could be placed in the same dispensing systems from which conventional ice cream cones are now dispensed. As such, individual ice cream cone holder and drip collector devices 30 could be dispensed in the same manner, namely by grasping the bottom most device 30 protruding from the bottom of the dispensing device and pulling it downwardly off of the devices 30 remaining therein. A vender can then insert a cone into device 30 and fold out skirt 34 before handing the ice cream cone to the customer. Alternatively, as mentioned with respect to devices 10, 100 and 200, device 30 could be packaged as part of a frozen ice cream cone product.

In light of the foregoing, it should thus be evident that the ice cream cone holder and drip collector devices constructed as described herein substantially improve the art and otherwise accomplish the objects of the present invention.

What is claimed is:

1. A device for collecting drips of ice cream from a cone having an open top for retaining ice cream such that the ice cream extends above the open top of the cone comprising a sleeve having a lower end and an open upper end and shaped for receiving at least a portion of the cone, and a skirt attached to said sleeve, said skirt being moveable from a first position wherein a plurality of the devices may be intimately stacked on and nested within each other, to a second position wherein said skirt extends outwardly from said sleeve to provide a drip catcher to collect melting ice cream with the provision that said skirt, in said first and second positions, does not extend beyond the open top of the cone.

2. A device according to claim 1 wherein said skirt is formed from a foldable material that is resistant to the moisture of melted ice cream.

3. A device according to claim 1 wherein said sleeve is shaped such that, when the cone is fitted into said sleeve, said open upper end of said sleeve is adjacent the open upper end of the cone.

4. A device for holding an ice cream cone and capable of collecting drips from the ice cream comprising a sleeve having a lower end and an open upper end and shaped for receiving at least a portion of the cone, and a skirt attached to said sleeve, said skirt being moveable from a first position wherein said skirt conforms to at least a portion of said sleeve to a second position wherein said skirt extends outwardly from said sleeve to define a drip catcher between said sleeve and said skirt to collect melting ice cream.

5. A device according to claim 4 wherein said skirt is formed from a folded material that is resistant to the moisture of melted ice cream.

6. A device according to claim 4 wherein said lower end of said sleeve encloses the bottom portion of the cone when the ice cream cone is fitted into said sleeve.

7. A device according to claim 4 herein said sleeve is shaped such that, when the ice cream cone is fitted into said sleeve, said open upper end of said sleeve is adjacent the open upper end of the cone.

8. A device for holding an ice cream cone and capable of collecting drips from the ice cream comprising a sleeve having a lower end and an open upper end and shaped for receiving at least a portion of the cone, and a skirt attached to said sleeve, said skirt being moveable from a first position wherein said skirt conforms to the shape of at least a portion of the cone, to a second position wherein said skirt extends outwardly from said sleeve to define a drip between either said cone and said skirt or said sleeve and said skirt catcher to collect melting ice cream.

9. A device according to claim 8 wherein said skirt is formed from a foldable material that is resistant to the moisture of melted ice cream.

10. A device according to claim 8 wherein said sleeve is shaped such that, when the cone is fitted into said sleeve, said open upper end of said sleeve is adjacent the open upper end of the cone.

\* \* \* \* \*